(12) United States Patent
Smith et al.

(10) Patent No.: US 12,036,485 B1
(45) Date of Patent: Jul. 16, 2024

(54) CONTINUOUS FLOW COLD WATER EXTRACTION

(71) Applicant: GREEN VAULT SYSTEMS LLC, Snohomish, WA (US)

(72) Inventors: Robert Dennis Smith, Snohomish, WA (US); Arnar Kristjan Olgeirsson, Shoreline, WA (US); Birgir G. Johannesson, Lynnwood, WA (US); Eric Kwan Wylie, Seattle, WA (US)

(73) Assignee: Green Vault Systems, LLC, Snohomish, WA (US)

(*) Notice: Subject to any disclaimer, the term of this patent is extended or adjusted under 35 U.S.C. 154(b) by 876 days.

(21) Appl. No.: 16/680,237

(22) Filed: Nov. 11, 2019

Related U.S. Application Data

(60) Provisional application No. 62/874,858, filed on Jul. 16, 2019.

(51) Int. Cl.
- *B01D 11/02* (2006.01)
- *B01D 29/56* (2006.01)
- *B03B 5/56* (2006.01)
- *C02F 1/00* (2023.01)

(52) U.S. Cl.
CPC ...... *B01D 11/0288* (2013.01); *B01D 11/0273* (2013.01); *B01D 29/56* (2013.01); *B03B 5/56* (2013.01); *C02F 1/004* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 260,407 | A * | 7/1882 | Payne | A01F 11/06 209/393 |
| 926,281 | A * | 6/1909 | Mcgoffin | B07B 1/24 99/635 |
| 1,068,004 | A * | 7/1913 | Northrop | A23N 15/02 100/98 R |
| 1,343,292 | A * | 6/1920 | Turner | B07B 1/24 209/393 |
| 1,430,636 | A * | 10/1922 | Forgeson | A47J 43/22 209/357 |

(Continued)

FOREIGN PATENT DOCUMENTS

| CN | 103013812 B | 7/2014 |
|---|---|---|
| WO | 2019056126 A1 | 3/2019 |

(Continued)

*Primary Examiner* — Robert J Popovics
(74) *Attorney, Agent, or Firm* — King IP Law; Joshua King

(57) ABSTRACT

A method of separating trichomes from cannabis plant flowers that begins with delivering the cannabis plant material to a hopper and continuously moving the cannabis material from the hopper to a porous container in a bath of cold water, at a controllable rate, and moving the cannabis material contained in the porous container, through the cold bath from an entrance end, to an exit end, thereby removing trichomes, which exit the porous container into the cold water. The remaining cannabis plant material is moved out of the exit end of the bath, at substantially the same rate as the cannabis plant material enters the bath. Finally, the water from the bath is substantially continuously filtered thereby separating the trichomes from the cold water.

11 Claims, 4 Drawing Sheets

(56) References Cited

U.S. PATENT DOCUMENTS

| | | | | |
|---|---|---|---|---|
| 1,594,999 A * | 8/1926 | Carter | B01D 36/02 | 210/403 |
| 1,598,419 A * | 8/1926 | Bonaventura | B07B 1/18 | 209/394 |
| 1,677,862 A * | 7/1928 | Herrold | B07B 1/22 | 209/288 |
| 1,755,336 A * | 4/1930 | Ryder | A23N 15/10 | 209/396 |
| 1,920,499 A * | 8/1933 | Flumerfelt | B01D 11/0273 | 554/20 |
| 2,002,974 A * | 5/1935 | Bennett | D01G 9/08 | 209/237 |
| 2,114,776 A * | 4/1938 | Davis | D06F 43/08 | 68/19.2 |
| 2,185,408 A * | 1/1940 | Kettenbach | A01C 1/08 | 366/225 |
| 2,304,669 A * | 12/1942 | Adams | C07C 37/0555 | 568/743 |
| 2,316,986 A * | 4/1943 | Victor | B07B 1/50 | 209/384 |
| 2,458,887 A * | 1/1949 | Winters | B07B 1/22 | 209/393 |
| 2,533,357 A * | 12/1950 | Crawford | A23N 12/005 | 134/19 |
| 2,562,221 A * | 7/1951 | Tour | C09H 3/00 | 554/20 |
| 2,652,588 A * | 9/1953 | Harris | A22C 29/046 | 452/15 |
| 2,664,204 A * | 12/1953 | Hurter | B01D 33/067 | 474/49 |
| 2,915,182 A * | 12/1959 | Burnet | B07B 13/02 | 209/384 |
| 2,928,117 A * | 3/1960 | Lapeyre | A22C 29/00 | 452/3 |
| 2,942,731 A * | 6/1960 | Soldini | B03B 9/063 | 209/293 |
| 3,079,761 A * | 3/1963 | Toulmin, Jr. | B01D 9/04 | 62/123 |
| 3,386,580 A * | 6/1968 | Grabarczyk | B01D 46/12 | 209/408 |
| 3,693,457 A * | 9/1972 | Pilat | G01N 15/0255 | 73/865.5 |
| 3,695,448 A * | 10/1972 | Johansson | B30B 9/12 | 210/405 |
| 3,729,096 A * | 4/1973 | Fitzner | B07B 1/22 | 209/406 |
| 3,800,943 A * | 4/1974 | Riesbeck | B07B 1/48 | 209/403 |
| 3,876,548 A * | 4/1975 | Welles, Jr. | B01D 33/275 | 210/402 |
| 3,984,287 A * | 10/1976 | Meadus | B01D 11/0273 | 210/511 |
| 4,051,771 A * | 10/1977 | Miyata | C12C 3/00 | 426/11 |
| 4,078,995 A * | 3/1978 | Utt | B07B 1/22 | 209/288 |
| 4,136,832 A * | 1/1979 | Morita | B02C 19/0087 | 209/288 |
| 4,137,723 A * | 2/1979 | Tyree, Jr. | A23L 3/363 | 62/85 |
| 4,140,629 A * | 2/1979 | Martindale | B01D 33/60 | 210/403 |
| 4,157,061 A * | 6/1979 | Margus, Jr. | A47J 27/16 | 99/371 |
| 4,168,597 A * | 9/1979 | Cayton | A23B 7/0408 | 53/391 |
| 4,199,442 A * | 4/1980 | Popow | B22C 5/06 | 209/408 |
| 4,236,995 A * | 12/1980 | Kruyer | C10G 1/047 | 209/17 |
| 4,236,999 A * | 12/1980 | Burgess | B01D 33/275 | 209/400 |
| 4,240,589 A * | 12/1980 | Martin | B07B 1/4681 | 209/44.3 |
| 4,279,824 A * | 7/1981 | McKinney | C07D 311/78 | 422/164 |
| 4,306,975 A * | 12/1981 | Siewert | D21B 1/32 | 210/403 |
| 4,327,594 A * | 5/1982 | Nelson | G01N 15/0255 | 73/863.22 |
| 4,371,436 A * | 2/1983 | Farber | C22B 9/023 | 209/268 |
| 4,507,202 A * | 3/1985 | Nord | B01D 33/11 | 210/197 |
| 4,620,478 A * | 11/1986 | Corominas | B01D 33/327 | 99/533 |
| 4,635,860 A * | 1/1987 | Kruyer | B02C 17/02 | 209/288 |
| 4,640,140 A * | 2/1987 | Burghoffer | G01N 15/0255 | 73/863.22 |
| 4,662,893 A * | 5/1987 | McIntosh | B01D 11/0273 | 210/174 |
| 4,692,248 A * | 9/1987 | Stannard | B01D 33/807 | 210/403 |
| 4,755,287 A * | 7/1988 | Jones | B07B 1/06 | 209/235 |
| 4,857,180 A * | 8/1989 | Eriksson | B07B 1/528 | 209/384 |
| 4,927,528 A * | 5/1990 | Doppstadt | B07B 9/00 | 209/291 |
| 4,935,124 A * | 6/1990 | Daugherty | D21B 1/023 | 209/384 |
| 5,054,506 A * | 10/1991 | Shakeri | B09C 1/02 | 210/522 |
| 5,075,004 A * | 12/1991 | Gershenson | B01D 29/27 | 210/453 |
| 5,137,632 A * | 8/1992 | Morgan, Jr. | B01D 29/23 | 210/453 |
| 5,192,424 A * | 3/1993 | Beyne | B01D 29/23 | 210/453 |
| 5,417,855 A * | 5/1995 | Gershenson | B01D 29/58 | 210/441 |
| 5,433,849 A * | 7/1995 | Zittel | B01D 33/72 | 209/291 |
| 5,472,600 A * | 12/1995 | Ellefson | B01J 20/28085 | 210/488 |
| 5,507,396 A * | 4/1996 | Hauch | B07B 1/48 | 209/406 |
| 5,587,073 A * | 12/1996 | Zittel | B01D 33/11 | 209/291 |
| 5,601,711 A * | 2/1997 | Sklar | B01D 21/262 | 210/232 |
| 5,632,195 A * | 5/1997 | Zittel | F28C 3/18 | 134/132 |
| 5,798,039 A * | 8/1998 | Wiesemann | B01D 33/801 | 210/402 |
| 5,964,100 A * | 10/1999 | Wisniewski | A23L 3/375 | 62/46.1 |
| 6,082,550 A * | 7/2000 | Metzner | A24B 3/10 | 131/312 |
| 6,158,591 A * | 12/2000 | Delp | B03B 1/00 | 209/172.5 |
| 6,220,534 B1 * | 4/2001 | Kratochwill | B01D 33/11 | 241/74 |
| 6,227,379 B1 * | 5/2001 | Nesseth | B01D 33/215 | 210/402 |
| 6,274,055 B1 * | 8/2001 | Zuk, Jr. | B01D 19/0031 | 210/488 |
| 6,305,552 B1 * | 10/2001 | Coleman | B07B 1/24 | 209/664 |
| 6,395,187 B1 * | 5/2002 | Alanis | B01D 29/6484 | 100/145 |
| 6,651,822 B2 * | 11/2003 | Alanis | B01D 29/6476 | 100/145 |
| 6,846,412 B2 * | 1/2005 | Hogan | B01D 29/58 | 210/231 |
| 6,860,392 B2 * | 3/2005 | Davis | B07B 1/22 | 209/288 |

(56) References Cited

U.S. PATENT DOCUMENTS

| | | | | |
|---|---|---|---|---|
| 6,925,857 B2* | 8/2005 | Weber | B07B 1/06 | 73/64.54 |
| 6,939,398 B2* | 9/2005 | Gorbulsky | B01D 47/16 | 96/277 |
| 7,001,515 B2* | 2/2006 | Sawhill | A23B 4/26 | 210/402 |
| 7,008,528 B2* | 3/2006 | Mitchell | C10G 21/00 | 134/40 |
| 7,037,437 B2* | 5/2006 | Sawhill | B01D 33/073 | 210/402 |
| 7,080,741 B1* | 7/2006 | Butzin | B07B 1/24 | 209/664 |
| 7,294,274 B2* | 11/2007 | Kirker | B01D 63/08 | 210/321.74 |
| 7,461,744 B2* | 12/2008 | Hautala | D21F 1/74 | 209/44.3 |
| 7,622,140 B2* | 11/2009 | Whittle | B01D 11/0242 | 426/494 |
| 7,699,178 B2* | 4/2010 | Kato | B07B 1/50 | 209/288 |
| 8,127,668 B2* | 3/2012 | Snyder, Jr. | A23N 15/025 | 99/636 |
| 8,317,034 B2* | 11/2012 | Fetrow | B03B 5/56 | 210/402 |
| 8,343,553 B2* | 1/2013 | Hospodor | A61P 1/08 | 424/725 |
| 8,535,543 B2* | 9/2013 | Fetrow | B03B 5/52 | 210/402 |
| 8,544,777 B2* | 10/2013 | Tsai | B29B 17/0026 | 241/82.5 |
| 8,574,517 B2* | 11/2013 | Christoffersson | C22B 7/008 | 423/594.18 |
| 8,640,877 B1* | 2/2014 | Pastorius | B01D 11/0219 | 209/44 |
| 8,671,738 B2* | 3/2014 | Witham | G01N 15/0255 | 73/863.22 |
| 8,728,801 B2* | 5/2014 | DeWaard | C05F 17/929 | 435/290.3 |
| 8,757,524 B2* | 6/2014 | Mosman | A01G 3/00 | 241/74 |
| 8,784,905 B2* | 7/2014 | Lin | A61K 9/06 | 424/401 |
| 8,851,409 B2* | 10/2014 | Koenig | B30B 9/3039 | 100/145 |
| 8,895,078 B2* | 11/2014 | Mueller | A61K 36/185 | 424/725 |
| 8,910,630 B2* | 12/2014 | Todd | A61M 16/0063 | 128/203.14 |
| 8,955,687 B1* | 2/2015 | Dews | B07B 1/02 | 241/168 |
| 9,034,395 B2* | 5/2015 | Whittle | A61K 36/185 | 424/494 |
| 9,050,631 B2* | 6/2015 | Raichart | B07B 1/288 | |
| 9,066,910 B2* | 6/2015 | Rosenblatt | A61P 1/08 | |
| 9,101,861 B2* | 8/2015 | Courtemanche | B01D 29/445 | |
| 9,155,767 B2* | 10/2015 | Hospodor | A61K 36/185 | |
| 9,161,566 B2* | 10/2015 | Hall | A23N 15/06 | |
| 9,199,960 B2* | 12/2015 | Ferri | A61P 25/04 | |
| 9,205,458 B2* | 12/2015 | Gandhi | G01N 1/4077 | |
| 9,327,210 B1* | 5/2016 | Jones | B01D 11/0296 | |
| 9,358,259 B2* | 6/2016 | Hospodor | B01D 11/0207 | |
| 9,380,805 B2* | 7/2016 | Holcomb | A23N 15/12 | |
| 9,408,986 B2* | 8/2016 | McCullough | B01D 11/00 | |
| 9,440,260 B2* | 9/2016 | Kelly | A01D 46/02 | |
| 9,468,152 B1* | 10/2016 | Jens | A01D 91/04 | |
| 9,616,366 B2* | 4/2017 | Umur | B01D 33/067 | |
| 9,629,886 B2* | 4/2017 | Franklin | A61K 9/20 | |
| 9,636,838 B2* | 5/2017 | Evans | A01G 3/0435 | |
| 9,655,936 B2* | 5/2017 | Ruben | A61K 36/185 | |
| 9,655,937 B2* | 5/2017 | Jones | B01D 11/0296 | |
| 9,669,328 B2* | 6/2017 | Jones | A61K 36/185 | |
| 9,682,488 B2* | 6/2017 | Beyerlein | A01G 3/00 | |
| 9,718,065 B1* | 8/2017 | Cilia | B03B 5/44 | |
| 9,730,911 B2* | 8/2017 | Verzura | A61P 1/00 | |
| 9,732,009 B2* | 8/2017 | Raber | A61P 25/04 | |
| 9,789,147 B2* | 10/2017 | Jones | B01D 11/0292 | |
| 9,808,494 B2* | 11/2017 | Barringer | B01D 11/0284 | |
| 9,844,740 B2* | 12/2017 | Jones | C11B 1/04 | |
| 9,867,859 B2* | 1/2018 | Raderman | A61K 31/05 | |
| 9,873,623 B2* | 1/2018 | Hawks | C02F 1/5281 | |
| 9,937,218 B2* | 4/2018 | Towle | A61K 36/185 | |
| 9,937,219 B2* | 4/2018 | Raderman | A61K 9/48 | |
| 9,950,275 B1* | 4/2018 | Ruben | C11B 3/006 | |
| 9,950,976 B1* | 4/2018 | Keller | B01D 11/0226 | |
| 9,955,716 B1* | 5/2018 | Nordahl | A61K 36/185 | |
| 9,956,174 B1* | 5/2018 | Nordahl | A61K 36/185 | |
| 9,974,235 B2* | 5/2018 | Van De Vegte | B25J 15/0441 | |
| 9,975,798 B2* | 5/2018 | Yamashita | B01D 21/2488 | |
| 9,981,203 B2* | 5/2018 | Shuja | B01D 11/028 | |
| 9,987,567 B1* | 6/2018 | Ko | B01D 15/00 | |
| 10,011,804 B2* | 7/2018 | Mancosky | C11B 1/02 | |
| 10,059,684 B2* | 8/2018 | Changoer | C07D 311/80 | |
| 10,105,343 B2* | 10/2018 | Kubby | A61K 36/185 | |
| 10,159,908 B2* | 12/2018 | Thomas | B01D 11/02 | |
| 10,172,897 B2* | 1/2019 | Vu | A24B 15/16 | |
| 10,183,131 B1* | 1/2019 | Skell | A61M 11/041 | |
| 10,189,762 B1* | 1/2019 | Oroskar | C07C 37/82 | |
| 10,195,159 B2* | 2/2019 | Whittle | A61K 31/05 | |
| 10,213,788 B2* | 2/2019 | Bates | B02C 19/16 | |
| 10,238,745 B2* | 3/2019 | Finley | A61K 47/22 | |
| 10,245,525 B1* | 4/2019 | Ko | B01D 46/0006 | |
| 10,265,362 B2* | 4/2019 | Schaneville | A61K 47/36 | |
| 10,286,340 B2* | 5/2019 | DeWaard | B01D 33/801 | |
| 10,308,625 B1* | 6/2019 | Ruben | C07D 311/80 | |
| 10,315,199 B2* | 6/2019 | Rose | B05B 13/04 | |
| 10,375,892 B2* | 8/2019 | Rose | A01D 91/00 | |
| 10,376,820 B2* | 8/2019 | Umur | B01D 33/11 | |
| 10,399,005 B2* | 9/2019 | Ko | B01D 11/0207 | |
| 10,399,712 B2* | 9/2019 | Longest, Jr. | B65B 1/36 | |
| 10,406,186 B2* | 9/2019 | Finley | A61K 36/185 | |
| 10,406,453 B2* | 9/2019 | Ko | B01D 11/0284 | |
| 10,413,843 B2* | 9/2019 | Ko | B01D 15/00 | |
| 10,413,845 B1* | 9/2019 | Tegen | B01D 11/0288 | |
| 10,414,709 B1* | 9/2019 | Tegen | B01D 11/0288 | |
| 10,415,740 B2* | 9/2019 | Evans | A01G 3/08 | |
| 10,428,040 B2* | 10/2019 | Dijkstra | C07D 311/80 | |
| 10,441,976 B2* | 10/2019 | Carniato | B01D 33/72 | |
| 10,478,747 B2* | 11/2019 | Ko | C11B 1/108 | |
| 10,499,584 B2* | 12/2019 | Fletcher | C12C 7/28 | |
| 10,506,768 B2* | 12/2019 | Albertz | A01D 46/005 | |
| 10,507,223 B2* | 12/2019 | Watts | B01D 46/30 | |
| 10,512,856 B1* | 12/2019 | Jackson | B01D 11/0492 | |
| 10,512,938 B2* | 12/2019 | Watts | A23L 3/361 | |
| 10,517,320 B2* | 12/2019 | Leo | A23L 7/10 | |
| 10,557,105 B1* | 2/2020 | Tran | C11B 1/104 | |
| 10,583,160 B2* | 3/2020 | Raderman | A61K 9/48 | |
| 10,595,474 B2* | 3/2020 | Leo | C05D 1/00 | |
| 10,597,348 B1* | 3/2020 | Nordahl | C07C 63/04 | |
| 10,603,611 B2* | 3/2020 | DeWaard | B01D 33/503 | |
| 10,603,675 B2* | 3/2020 | DeWaard | B01D 33/067 | |
| 10,611,713 B2* | 4/2020 | Chen | C07C 37/004 | |
| 10,646,793 B2* | 5/2020 | Ko | C11B 3/12 | |
| 10,646,881 B1* | 5/2020 | Page | B02C 19/18 | |
| 10,661,036 B2* | 5/2020 | McCullough | A61M 15/002 | |
| 10,667,556 B2* | 6/2020 | Schneider | A61M 11/041 | |
| 10,687,476 B2* | 6/2020 | Gowa | B23K 26/402 | |
| 10,688,410 B2* | 6/2020 | Dimitrelos | B01D 5/006 | |
| 10,694,683 B2* | 6/2020 | Leo | A01G 9/18 | |
| 10,695,316 B2* | 6/2020 | Macaluso | A61K 36/185 | |
| 10,717,717 B2* | 7/2020 | Castillo | B01D 11/028 | |
| 10,724,048 B2* | 7/2020 | Sayre | A01H 6/28 | |
| 10,738,268 B2* | 8/2020 | Leo | A23L 2/46 | |
| 10,750,763 B2* | 8/2020 | Franklin | A61K 31/352 | |
| 10,751,722 B1* | 8/2020 | Pearson | B02C 4/42 | |
| 10,758,579 B2* | 9/2020 | Murphy | A61K 36/185 | |
| 10,758,940 B1* | 9/2020 | Young | B07B 1/02 | |
| 10,765,965 B1* | 9/2020 | Sherwood | B01D 3/10 | |
| 10,773,184 B2* | 9/2020 | Held | C07D 311/80 | |
| 10,779,557 B2* | 9/2020 | Franklin | A61K 31/352 | |
| 10,780,442 B2* | 9/2020 | Pal | A24B 15/00 | |
| 10,787,429 B1* | 9/2020 | Casellas | A23L 33/105 | |
| 10,792,595 B2* | 10/2020 | Van den Berg | B01D 33/073 | |

(56) References Cited

U.S. PATENT DOCUMENTS

| | | | | |
|---|---|---|---|---|
| 10,793,498 B2* | 10/2020 | Jansen | B01D 5/0048 |
| 10,799,546 B1 | 10/2020 | Jansen | B01D 15/1828 |
| 10,799,812 B2* | 10/2020 | Gildrien | B01D 3/143 |
| 10,814,338 B2* | 10/2020 | Stephens | B04B 11/06 |
| 10,835,904 B2* | 11/2020 | Cilia | B03B 5/44 |
| 10,842,080 B2* | 11/2020 | Ingram | A01D 34/53 |
| 10,851,038 B1* | 12/2020 | Novitski | C07C 37/72 |
| 10,851,076 B2* | 12/2020 | Bethers | B01D 9/0036 |
| 10,858,542 B2* | 12/2020 | Hood | B01D 11/0249 |
| 10,882,266 B2* | 1/2021 | Britton | B30B 9/047 |
| 10,888,108 B2* | 1/2021 | Longest | A24F 23/02 |
| 10,899,728 B2* | 1/2021 | Stephens | B01D 3/40 |
| 10,919,828 B1* | 2/2021 | Roa-Espinosa | A23K 10/30 |
| 10,933,347 B2* | 3/2021 | Camilleri | B01D 11/0257 |
| 10,933,348 B2* | 3/2021 | Camilleri | B01D 11/0257 |
| 10,940,173 B2* | 3/2021 | Finley | A61K 31/353 |
| 10,946,306 B1* | 3/2021 | Lander | B01D 11/0284 |
| 10,946,307 B2* | 3/2021 | Hari | C07C 37/82 |
| 10,960,322 B2* | 3/2021 | Bethers | B01D 9/005 |
| 10,968,194 B2* | 4/2021 | Stephens | C07C 37/685 |
| 10,974,982 B2* | 4/2021 | Yamashita | B01D 21/2488 |
| 10,975,379 B2* | 4/2021 | Keasling | C12N 15/8243 |
| 10,981,856 B1* | 4/2021 | Nordahl | C07B 63/00 |
| 10,993,977 B2* | 5/2021 | Jansen | B01D 15/1828 |
| 11,000,856 B2* | 5/2021 | Pal | B02C 21/00 |
| 11,007,238 B2* | 5/2021 | Raderman | A61K 9/48 |
| 11,014,098 B2* | 5/2021 | Stephens | B01D 11/0273 |
| 11,021,675 B2* | 6/2021 | Chordia | C11B 3/006 |
| 11,027,218 B2* | 6/2021 | Levy | B01D 11/0292 |
| 11,078,176 B2* | 8/2021 | Tegen | B01D 11/0288 |
| 11,089,731 B2* | 8/2021 | Harold | A01G 3/08 |
| 11,097,282 B2* | 8/2021 | Hall | B02C 23/18 |
| 11,141,680 B2* | 10/2021 | Gildrien | B01D 11/048 |
| 11,154,579 B2* | 10/2021 | Castillo | B01D 11/0288 |
| 11,167,225 B2* | 11/2021 | Levitt | B01D 29/23 |
| 11,213,771 B2* | 1/2022 | Hicks | B01D 33/48 |
| 11,219,652 B2* | 1/2022 | Xie | A61K 36/537 |
| 11,224,587 B2* | 1/2022 | Sorbo | B01D 11/0203 |
| 11,291,699 B1* | 4/2022 | Benner | A61K 31/05 |
| 11,298,633 B2* | 4/2022 | Murphy | B01D 21/267 |
| 11,331,594 B2* | 5/2022 | Robbins | B01D 11/0273 |
| 11,364,505 B2* | 6/2022 | Samburski | B02C 19/06 |
| 11,364,506 B2* | 6/2022 | Faro | B02C 17/00 |
| 11,369,974 B2* | 6/2022 | Faro | B02C 21/007 |
| 11,375,671 B2* | 7/2022 | Camaren | A23N 15/02 |
| 11,376,607 B2* | 7/2022 | Faro | B65G 47/50 |
| 11,376,608 B2* | 7/2022 | Faro | A01G 3/085 |
| 11,382,269 B2* | 7/2022 | Scott | A01F 29/10 |
| 11,406,123 B2* | 8/2022 | Savage | A23N 12/005 |
| 11,406,914 B2* | 8/2022 | Shi | B01D 11/0296 |
| 11,433,428 B2* | 9/2022 | Arnovick | B01D 50/20 |
| 11,447,277 B2* | 9/2022 | Longest, Jr. | B65B 1/16 |
| 11,597,712 B2* | 3/2023 | Castillo | C07D 311/80 |
| 11,744,275 B2* | 9/2023 | Longest | A24F 23/02 53/450 |
| 11,767,490 B2* | 9/2023 | Wirtz | B01D 11/0207 422/280 |
| 11,813,555 B2* | 11/2023 | Lautenschläger | H05B 6/802 |
| 11,849,755 B2* | 12/2023 | Liu | B07B 1/18 |
| 2003/0017216 A1* | 1/2003 | Schmidt | A61K 36/185 424/725 |
| 2004/0079234 A1* | 4/2004 | Gorbulsky | B01D 46/0056 96/234 |
| 2004/0147767 A1* | 7/2004 | Whittle | A61K 36/185 549/390 |
| 2005/0023219 A1* | 2/2005 | Kirker | B01D 63/08 210/636 |
| 2005/0077254 A1* | 4/2005 | Sawhill | A23B 4/28 210/402 |
| 2006/0112619 A1* | 6/2006 | Oderwald | A01G 2/10 47/1.7 |
| 2006/0273048 A1* | 12/2006 | Doyle | B01D 33/802 210/781 |
| 2010/0119606 A1* | 5/2010 | Whittle | A61K 36/185 424/484 |
| 2010/0124583 A1 | 5/2010 | Medoff | |
| 2011/0048253 A1 | 3/2011 | Melandri et al. | |
| 2011/0198268 A1* | 8/2011 | DeWaard | B01D 33/11 209/270 |
| 2011/0284442 A1* | 11/2011 | Williams | B01D 29/58 210/170.09 |
| 2012/0085848 A1* | 4/2012 | Sharp | B02C 17/002 241/220 |
| 2012/0201729 A1* | 8/2012 | Christoffersson | C22B 43/00 423/101 |
| 2012/0263804 A1* | 10/2012 | Hospodor | A61P 25/18 422/261 |
| 2012/0267460 A1* | 10/2012 | Tsai | B29B 17/0026 241/65 |
| 2012/0279193 A1* | 11/2012 | Mosman | A01G 3/00 56/233 |
| 2013/0079531 A1* | 3/2013 | Barringer | C07D 311/78 422/255 |
| 2013/0220895 A1* | 8/2013 | Tucker | B07B 1/02 209/235 |
| 2013/0251824 A1* | 9/2013 | Hospodor | B01D 11/0265 422/128 |
| 2013/0306524 A1 | 11/2013 | Welch | |
| 2014/0030394 A1* | 1/2014 | Pryor | B26F 3/004 426/231 |
| 2014/0196587 A1* | 7/2014 | Beyerlein | A01G 3/00 83/331 |
| 2014/0216989 A1* | 8/2014 | Raichart | B07B 1/22 209/235 |
| 2015/0008193 A1* | 1/2015 | DeWaard | B01D 33/067 210/396 |
| 2015/0041082 A1* | 2/2015 | Mitchell | B01D 11/0238 162/14 |
| 2015/0053594 A1* | 2/2015 | DeWaard | B07B 1/24 209/17 |
| 2015/0076084 A1* | 3/2015 | Tange | B01D 37/04 210/770 |
| 2015/0082695 A1* | 3/2015 | Rodel | A01G 3/00 83/365 |
| 2015/0105569 A1* | 4/2015 | Emo | C11B 9/025 554/20 |
| 2015/0166502 A1* | 6/2015 | Love | C07D 311/80 422/261 |
| 2015/0273527 A1* | 10/2015 | Kelly | A23N 11/00 209/288 |
| 2015/0285427 A1* | 10/2015 | Evans | B26D 7/0691 83/859 |
| 2015/0290827 A1* | 10/2015 | Evans | A01G 3/0435 83/698.11 |
| 2015/0316451 A1* | 11/2015 | Sercel | G01N 35/00732 435/286.2 |
| 2015/0343343 A1* | 12/2015 | DeWaard | B01D 33/72 210/380.1 |
| 2016/0023365 A1* | 1/2016 | Hall | A23N 15/02 241/191 |
| 2016/0038437 A1* | 2/2016 | Whittle | A61K 36/185 514/733 |
| 2016/0057940 A1* | 3/2016 | Lyons | A01G 3/02 47/1.43 |
| 2016/0115065 A1* | 4/2016 | Yamashita | C02F 11/147 210/174 |
| 2016/0115066 A1* | 4/2016 | Yamashita | C02F 11/02 210/252 |
| 2016/0136541 A1* | 5/2016 | Jones | B01D 11/0288 422/119 |
| 2016/0213722 A1* | 7/2016 | Jones | B01D 11/0207 |
| 2016/0243473 A1* | 8/2016 | Hicks | B01D 33/17 |
| 2016/0279535 A1* | 9/2016 | Jones | B01D 11/0207 |
| 2016/0287652 A1* | 10/2016 | Scott | A61P 17/02 |
| 2016/0346339 A1* | 12/2016 | Finley | A61K 31/353 |
| 2017/0001200 A1* | 1/2017 | Leffel | A61K 36/185 |
| 2017/0002292 A1* | 1/2017 | Cumings | B01D 11/0219 |
| 2017/0043276 A1* | 2/2017 | Tennant | C07D 311/80 |
| 2017/0164557 A1* | 6/2017 | Harold | A01D 46/02 |

(56) References Cited

U.S. PATENT DOCUMENTS

| | | | |
|---|---|---|---|
| 2017/0188523 A1* | 7/2017 | Black | A01G 3/08 |
| 2017/0188623 A1* | 7/2017 | Cranford | A24C 5/06 |
| 2017/0197217 A1* | 7/2017 | Bruggemann | A23N 15/00 |
| 2017/0202896 A1* | 7/2017 | Hugh | A23L 33/105 |
| 2017/0252385 A1* | 9/2017 | Jones | B01D 11/0288 |
| 2017/0274298 A1* | 9/2017 | Jones | C11B 1/04 |
| 2017/0312327 A1* | 11/2017 | Jones | B01D 11/0215 |
| 2017/0326472 A1* | 11/2017 | McGhee | C11B 1/102 |
| 2017/0368022 A1* | 12/2017 | Sorbo | B01D 11/0273 |
| 2018/0007852 A1* | 1/2018 | Rose | A61K 36/185 |
| 2018/0008656 A1* | 1/2018 | Watts | A23L 3/44 |
| 2018/0008906 A1* | 1/2018 | Kogon | B01D 11/0284 |
| 2018/0037845 A1* | 2/2018 | Manchester | B01F 35/3204 |
| 2018/0065124 A1* | 3/2018 | Cecchi | A23N 15/00 |
| 2018/0099017 A1* | 4/2018 | Jones | B01D 11/0288 |
| 2018/0220589 A1* | 8/2018 | Burden | A01G 3/08 |
| 2018/0230036 A1* | 8/2018 | Yamashita | B01D 21/2488 |
| 2018/0265803 A1* | 9/2018 | Cumings | C11B 3/02 |
| 2018/0304274 A1* | 10/2018 | Bates | A61K 36/00 |
| 2018/0339298 A1* | 11/2018 | Mayers | B03B 4/02 |
| 2018/0344790 A1* | 12/2018 | Vu | A24D 1/18 |
| 2018/0352848 A1* | 12/2018 | Vu | A24B 15/42 |
| 2018/0369716 A1* | 12/2018 | Robbins | B01D 11/0223 |
| 2019/0010421 A1* | 1/2019 | Emo | C11B 9/025 |
| 2019/0029284 A1* | 1/2019 | Li | B01D 11/00 |
| 2019/0039074 A1* | 2/2019 | Rose | B05B 13/04 |
| 2019/0046998 A1* | 2/2019 | Stephens | B04B 3/00 |
| 2019/0054393 A1* | 2/2019 | Camilleri | B01D 11/0257 |
| 2019/0075733 A1* | 3/2019 | Albertz | A01D 46/005 |
| 2019/0083558 A1* | 3/2019 | Watts | A23L 3/375 |
| 2019/0099695 A1* | 4/2019 | Ko | B01D 3/40 |
| 2019/0099696 A1* | 4/2019 | Ko | B01D 11/0284 |
| 2019/0104887 A1* | 4/2019 | Tussey | B02C 18/24 |
| 2019/0111368 A1* | 4/2019 | Crippen | C02F 1/001 |
| 2019/0118187 A1* | 4/2019 | Nahtigal | B02C 18/18 |
| 2019/0124851 A1* | 5/2019 | Ingram | A01D 34/53 |
| 2019/0134125 A1* | 5/2019 | Vu | A24D 1/18 |
| 2019/0143246 A1* | 5/2019 | Ko | B01D 15/00 422/270 |
| 2019/0168232 A1* | 6/2019 | Bruggemann | A01F 12/442 |
| 2019/0183848 A1* | 6/2019 | Sorbo | B01D 11/0203 |
| 2019/0192992 A1* | 6/2019 | Ko | B01D 35/18 |
| 2019/0192993 A1* | 6/2019 | Levy | B01D 9/0018 |
| 2019/0194585 A1* | 6/2019 | Vanevenhoven | C12C 3/06 |
| 2019/0201936 A1* | 7/2019 | Rystadt | B07B 1/22 |
| 2019/0231833 A1* | 8/2019 | Garti | B01D 11/0288 |
| 2019/0241536 A1* | 8/2019 | Durkacz | B01D 11/0203 |
| 2019/0246568 A1* | 8/2019 | Seidel | B02C 17/02 |
| 2019/0276384 A1* | 9/2019 | Chen | C07C 37/004 |
| 2019/0281872 A1* | 9/2019 | Cilia | C12C 7/205 |
| 2019/0283038 A1* | 9/2019 | Cilia | B03B 7/00 |
| 2019/0299218 A1* | 10/2019 | Camaren | A01G 3/00 |
| 2019/0321428 A1* | 10/2019 | Antony | A61K 31/375 |
| 2020/0000111 A1* | 1/2020 | Sandelman | A23B 4/037 |
| 2020/0016508 A1* | 1/2020 | Hari | H01J 49/0027 |
| 2020/0030397 A1* | 1/2020 | Himes | A61K 31/352 |
| 2020/0039908 A1* | 2/2020 | ElSohly | C07C 37/74 |
| 2020/0047081 A1* | 2/2020 | Ko | C11B 1/10 |
| 2020/0054962 A1* | 2/2020 | Vanaman | B01D 3/38 |
| 2020/0086229 A1* | 3/2020 | Ko | A61K 36/185 |
| 2020/0100507 A1* | 4/2020 | Hoeflich | A01N 65/10 |
| 2020/0108018 A1* | 4/2020 | Shadurin | A24C 5/02 |
| 2020/0108110 A1* | 4/2020 | Antony | A61P 9/12 |
| 2020/0108398 A1* | 4/2020 | Tharp | A24B 15/18 |
| 2020/0122052 A1* | 4/2020 | Tucker | A23L 33/105 |
| 2020/0138774 A1* | 5/2020 | Sorbo | A61K 36/81 |
| 2020/0155995 A1* | 5/2020 | Kolesinski | B01D 53/06 |
| 2020/0191480 A1* | 6/2020 | Baughman | A24B 15/18 |
| 2020/0199055 A1* | 6/2020 | Jansen | C07D 311/78 |
| 2020/0221644 A1* | 7/2020 | Nahtigal | B02C 18/10 |
| 2020/0222829 A1* | 7/2020 | Gildrien | B30B 9/04 |
| 2020/0222910 A1* | 7/2020 | Nahtigal | B02C 18/18 |
| 2020/0230530 A1* | 7/2020 | Levitt | B01D 11/0288 |
| 2020/0248032 A1* | 8/2020 | Hood | B01D 11/0257 |
| 2020/0248098 A1* | 8/2020 | Hilpert | B01D 11/0288 |
| 2020/0261824 A1* | 8/2020 | Pal | B01D 37/00 |
| 2020/0282328 A1* | 9/2020 | Camilleri | B01D 11/0257 |
| 2020/0298245 A1* | 9/2020 | Seydelmann | B02C 18/362 |
| 2020/0306329 A1* | 10/2020 | Castillo | B01D 11/0288 |
| 2020/0308133 A1* | 10/2020 | Stephens | C07C 37/82 |
| 2020/0317631 A1* | 10/2020 | Castillo | B01D 11/0288 |
| 2020/0323938 A1* | 10/2020 | Theis | A61K 36/185 |
| 2020/0338566 A1* | 10/2020 | Bruggemann | A01G 3/002 |
| 2020/0360930 A1* | 11/2020 | Pal | B02C 23/10 |
| 2020/0361841 A1* | 11/2020 | Stone | C07C 37/685 |
| 2020/0384045 A1* | 12/2020 | Arnovick | A23L 3/375 |
| 2020/0390838 A1* | 12/2020 | Kotra | B01D 11/0288 |
| 2021/0016202 A1* | 1/2021 | Gildrien | B01D 11/0288 |
| 2021/0023155 A1* | 1/2021 | Opperman | B01D 11/0288 |
| 2021/0030824 A1* | 2/2021 | Jansen | A61K 36/185 |
| 2021/0040414 A1* | 2/2021 | Tran | C11B 1/04 |
| 2021/0068444 A1* | 3/2021 | Alarcon | A24F 40/20 |
| 2021/0069730 A1* | 3/2021 | Stephens | B01D 11/0273 |
| 2021/0094929 A1* | 4/2021 | Tegen | A61K 36/185 |
| 2021/0095226 A1* | 4/2021 | Manchester | B01D 11/0484 |
| 2021/0121793 A1* | 4/2021 | Hausman | H04L 9/0643 |
| 2021/0163824 A1* | 6/2021 | Sunderland | C10B 53/02 |
| 2021/0178285 A1* | 6/2021 | Camilleri | B01D 11/0257 |
| 2021/0178286 A1* | 6/2021 | Camilleri | B01D 11/0257 |
| 2021/0214330 A1* | 7/2021 | Stephens | C07C 37/72 |
| 2021/0214331 A1* | 7/2021 | Stephens | C07C 37/72 |
| 2021/0220282 A1* | 7/2021 | Shadurin | A24D 1/02 |
| 2021/0220843 A1* | 7/2021 | Stephens | B01D 11/0273 |
| 2021/0229112 A1* | 7/2021 | Stephens | B04B 3/00 |
| 2021/0245073 A1* | 8/2021 | Mayer | B01D 11/0288 |
| 2021/0247138 A1* | 8/2021 | Hausman | F26B 15/18 |
| 2021/0251157 A1* | 8/2021 | Leo | B01D 1/227 |
| 2021/0268401 A1* | 9/2021 | Wirtz | B01D 11/028 |
| 2021/0269737 A1* | 9/2021 | Wirtz | C11B 3/006 |
| 2021/0354049 A1* | 11/2021 | Digertt | B01D 11/0288 |
| 2021/0363462 A1* | 11/2021 | Castellanos | B01F 27/91 |
| 2021/0370350 A1* | 12/2021 | Orman | B07B 1/22 |
| 2021/0387109 A1* | 12/2021 | Gildrien | B01D 11/0288 |
| 2022/0012782 A1* | 1/2022 | Thibodeau | G06Q 30/0283 |
| 2022/0047660 A1* | 2/2022 | Castillo | A61K 31/352 |
| 2022/0047965 A1* | 2/2022 | Zumpano | B01D 11/028 |
| 2022/0064566 A1* | 3/2022 | Zumpano | C07C 51/48 |
| 2022/0126224 A1* | 4/2022 | MacGowan | B01D 11/0261 |
| 2022/0184632 A1* | 6/2022 | Britton | B01F 27/806 |
| 2022/0272993 A1* | 9/2022 | Sandelman | F26B 19/00 |
| 2022/0282400 A1* | 9/2022 | Sample | D01B 1/44 |
| 2022/0354063 A1* | 11/2022 | Fujikawa | A01G 31/047 |
| 2023/0086618 A1* | 3/2023 | Myers | A61K 36/185 |
| 2023/0182036 A1* | 6/2023 | Digertt | B01D 11/0292 424/778 |
| 2023/0233962 A1* | 7/2023 | Digertt | B01D 35/20 422/261 |
| 2023/0311162 A1* | 10/2023 | Laeger | B07B 13/16 209/240 |

FOREIGN PATENT DOCUMENTS

| | | | |
|---|---|---|---|
| WO | WO-2020168413 A1 * | 8/2020 | A24B 15/00 |
| WO | WO-2020176806 A1 * | 9/2020 | A23L 27/11 |
| WO | WO-2022139599 A1 * | 6/2022 | |
| WO | WO-2022139600 A1 * | 6/2022 | |
| WO | WO-2022139601 A1 * | 6/2022 | |
| WO | WO-2022139602 A1 * | 6/2022 | |

* cited by examiner

CONTINUOUS FLOW COLD WATER EXTRACTION

BACKGROUND OF THE INVENTION

A trichome is a small hair/pouch that grows (in great number) from a cannabis flower. Trichomes, when separated from the rest of the plant matter, are far more valuable than they are when they remain attached. Accordingly, techniques have been developed for the separation of the trichomes from the cannabis plant flowers. In one technique, by batch processing, vats of about 20-40 gallon capacity are used. A sequence of bag filters, of increasingly fine pore size from innermost to outermost are placed in the vat, which is then filled with cannabis, water and ice. Cold water causes the trichomes to become brittle and detach easily. The bag filters are removed in sequence, letting the cold water pour through them as they are removed. The first bag filters are filled with plant matter, but not trichomes, but the trichomes will tend to be captured in various filters, usually in the 120-40 micron mesh range. These are gently removed.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method of separating trichomes from cannabis plant material that begins with delivering the cannabis plant material to a hopper and continuously moving the cannabis material from the hopper to a porous container in a bath of cold water, at a controllable rate, and moving the cannabis material contained in the porous container, through the cold bath from an entrance end, to an exit end, thereby separating trichomes from other plant matter, which exit the porous container into the cold water. The remaining cannabis plant material is moved out of the exit end of the bath, at substantially the same rate as the cannabis plant material enters the bath. Finally, the water from the bath is substantially continuously filtered thereby separating the trichomes from the cold water.

In a second separate aspect, the present invention may take the form of an assembly for separating trichomes from cannabis plant flowers (CPF), comprising a hopper with conveyor or other method of continuous delivery; a bath of cold water having an entrance end and an exit end and a porous container, having pores, and partially submerged in the bath of cold water, and being controllably moveable in the bath. Also, a CPF movement assembly is configured to automatically and substantially continuously move the CPF from the hopper to the porous container at the entrance end of the bath, at a controllable rate and a porous container movement assembly moves the porous container so as to move the CPF through the cold bath from the entrance end, to the exit end, and also agitates the CPF, thereby separating trichomes, which exit the porous container through the pores, and so as to deliver remaining CPF to the exit end of the bath. A filtering assembly substantially continuously filters the cold water, and thereby separating the trichomes from the cold water and a sensing and control assembly, control the assemblies to work in coordination.

BRIEF DESCRIPTION OF DRAWINGS

Various embodiments of the invention are disclosed in the following detailed description and accompanying drawings.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

To assist the description of the scope and its components the coordinate terms "upstream" and "downstream" are used to describe the disclosed embodiments. The terms are used consistently with the description of the exemplary applications and are in reference to the direction of material flow. In this application, "continually" refers to a short-term constant process, for example continuing uninterrupted for a number of hours. In a longer-term context, interruptions may occur.

Figure 1:
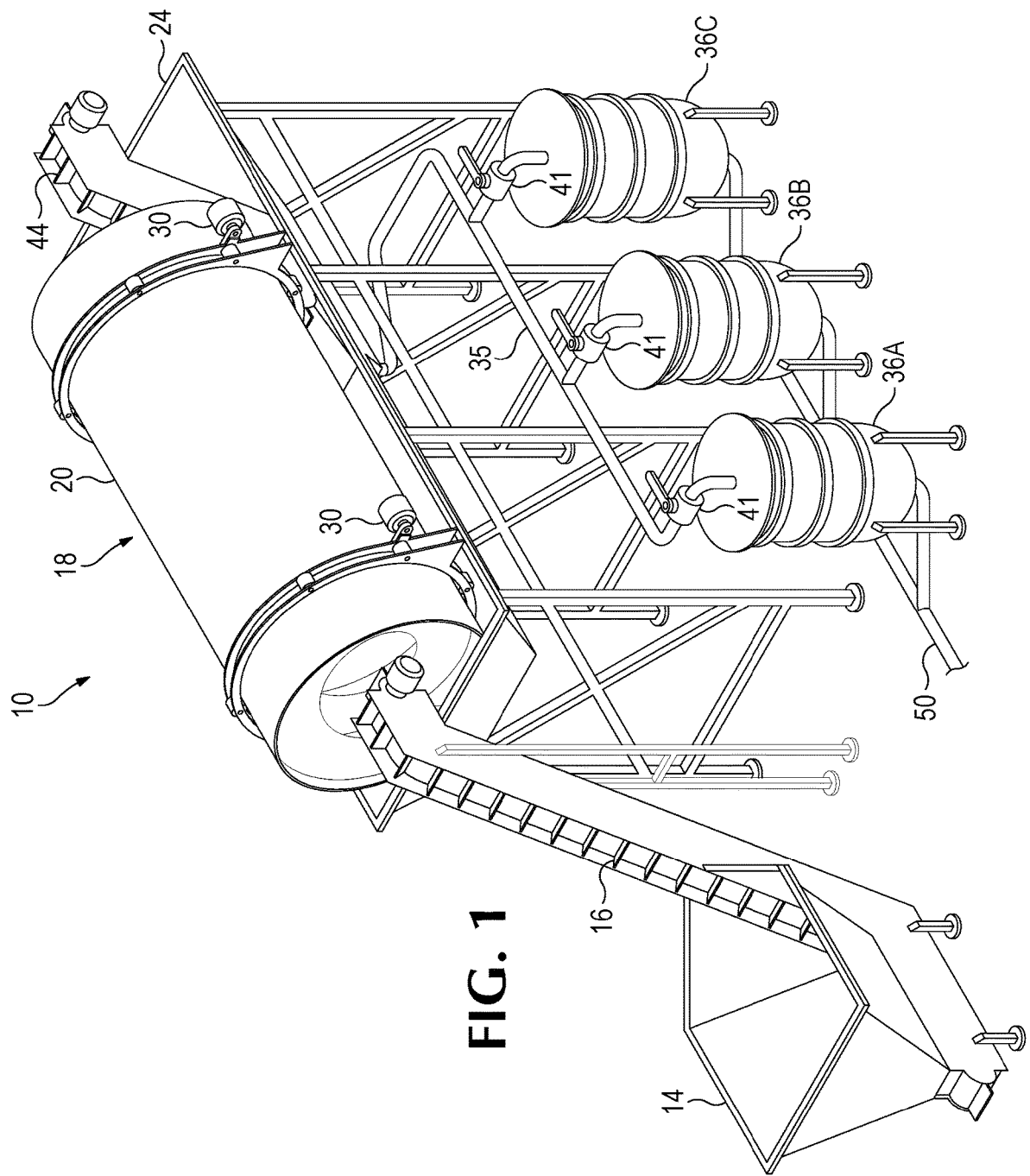
FIG. 1 is an isometric view of a continuous cannabis trichome separation and processing assembly, according to the present invention.
Figure 2:
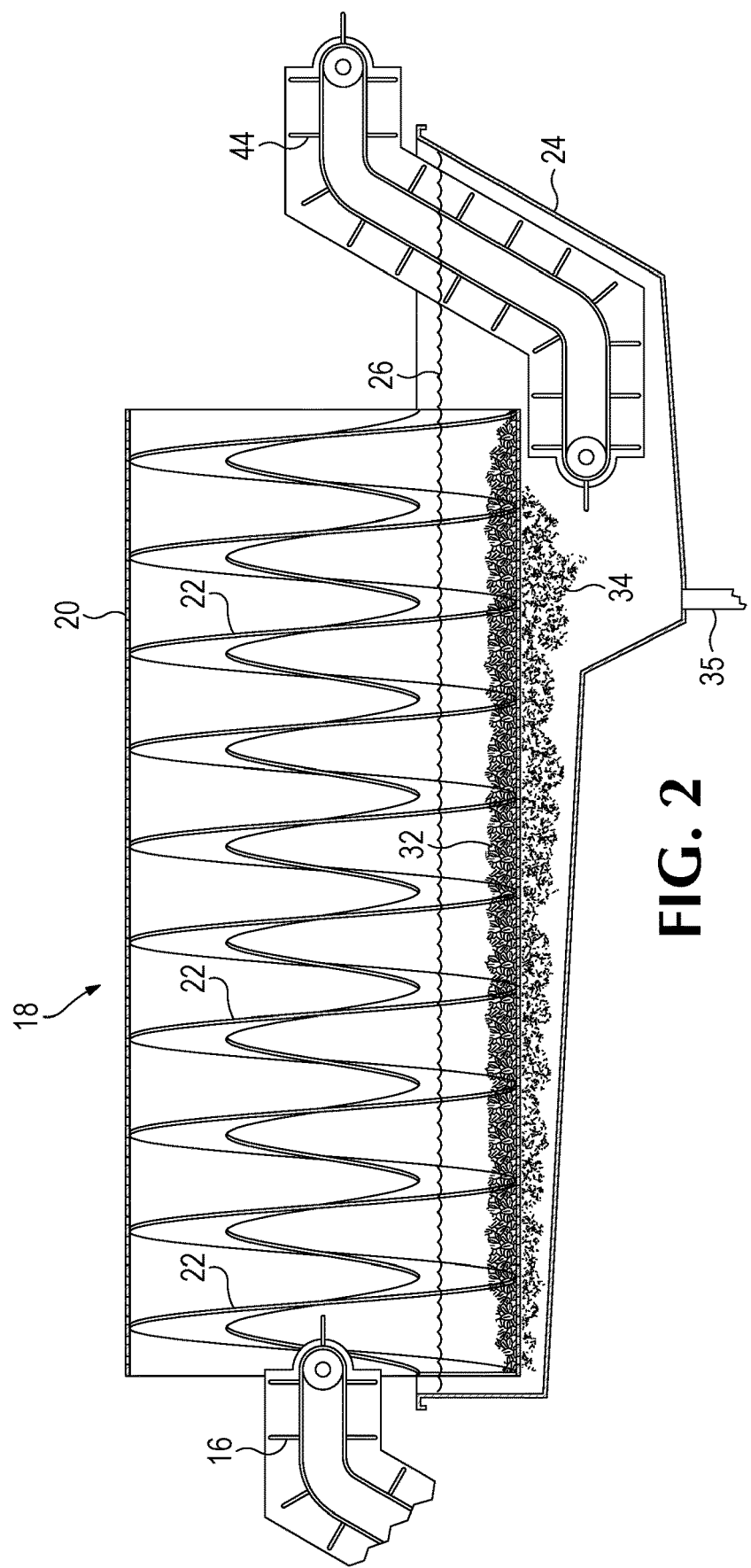
FIG. 2 is a sectional view of the extraction unit of the assembly of FIG. 1.
Figure 4:
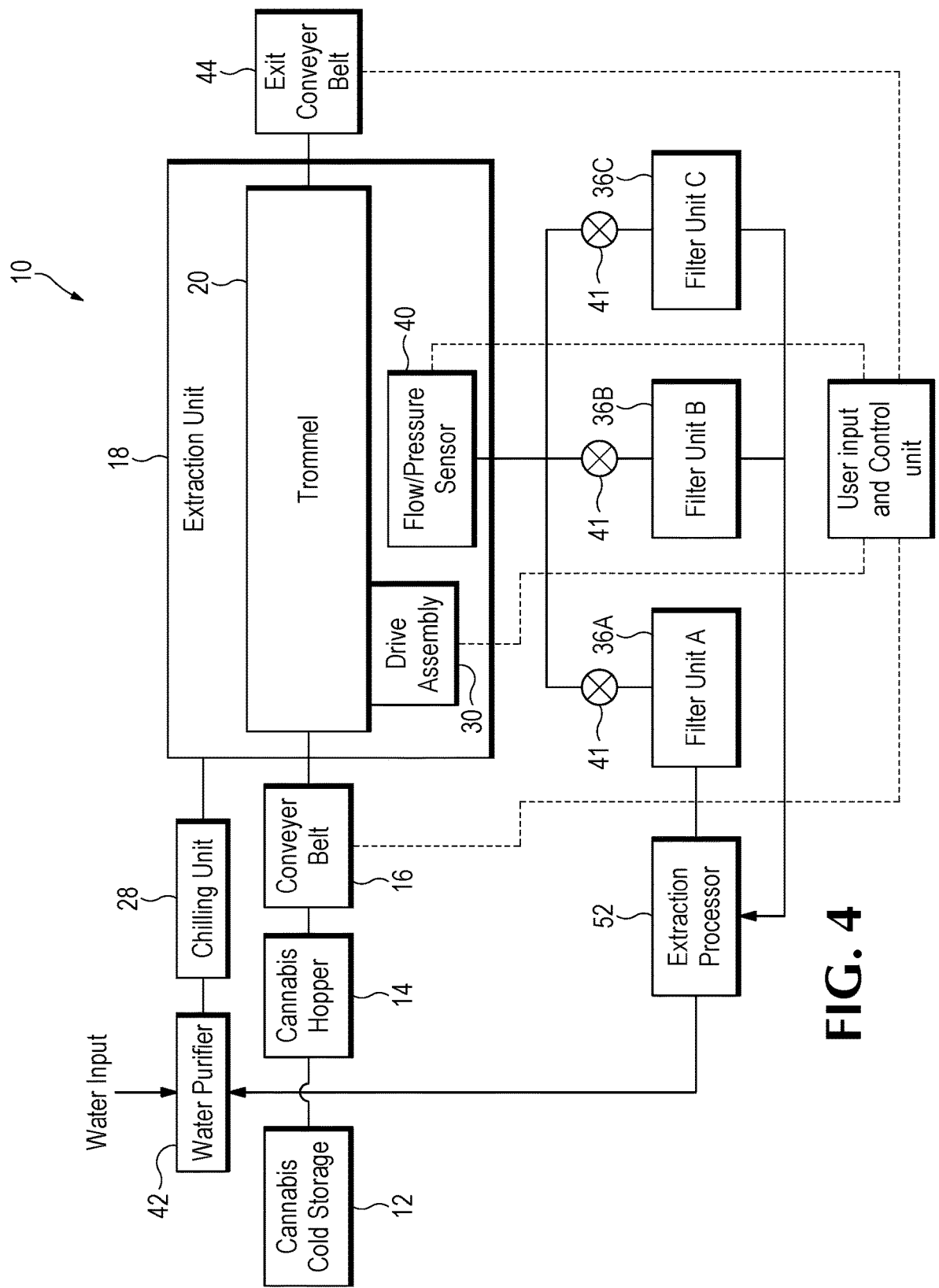
FIG. 4 is a system block diagram of the assembly of FIG. 1

A preferred embodiment of the present invention takes the form of a process and system 10 of separating and/or extracting trichomes and/or other cannabinoids from the cannabis plant flowers (CPF) in a continuous flow. Although the following discussion is directed to the processing of CPF, the described apparatus and method is applicable to the processing of other plant matter, and there is no intent to limit the disclosure to the processing of only CPF. The process can be automated and is scalable for high throughput, industrial scale processing of the CPF. In broad overview, pre-chilled CPF, chilled soon after harvest and maintained in a cold storage unit 12 (FIG. 4), is fed to a hopper 14, from whence an infeed conveyer 16 moves the product into the horizontal extraction unit 18 at a controlled rate. The extraction unit 18 includes a perforated horizontal drum (also termed a "trommel") 20 with internal helical flights 22 (FIG. 2) that is partially submerged in a tank 24, partially filled with chilled water 26, maintained at a temperature of less than 36° F., by a chilling unit 28 (FIG. 4).

Trommel 20 is rotated by a drive assembly 30, at a rate of speed needed to achieve a desired CPF dwell time, while adequately agitating the CPF. In an embodiment, drive assembly 30 includes an electric motor or motors and drive wheels. The CPF moves through the trommel 20 at a rate of (trommel rotation speed)×(helical flight pitch). Accordingly, if the pitch is 12 inches between flights and the rotation speed is once per minute, the CPF will move at 12 inches per minute. The dwell time is the trommel 20 length, divided by the rate of CPF movement. The CPF 32 soaking in the chilled water 26 along with the gentle agitation caused by trommel 20 rotation will act to release the trichomes into the water, together with other plant parts 34 (FIG. 2) that fit through the trommel 20 perforations. In some methods, ice pieces are introduced into the trommel to impact and work the CPF to release the trichomes. In another embodiment, trommel 20 includes interior horizontal flights, paralleling the trommel axis of rotation, to lift and drop the CPF, as the trommel rotates, increasing the degree of agitation. An outfeed or exit conveyor 44 moves the remaining raw material out of the extraction unit for recovery.

Figure 3:
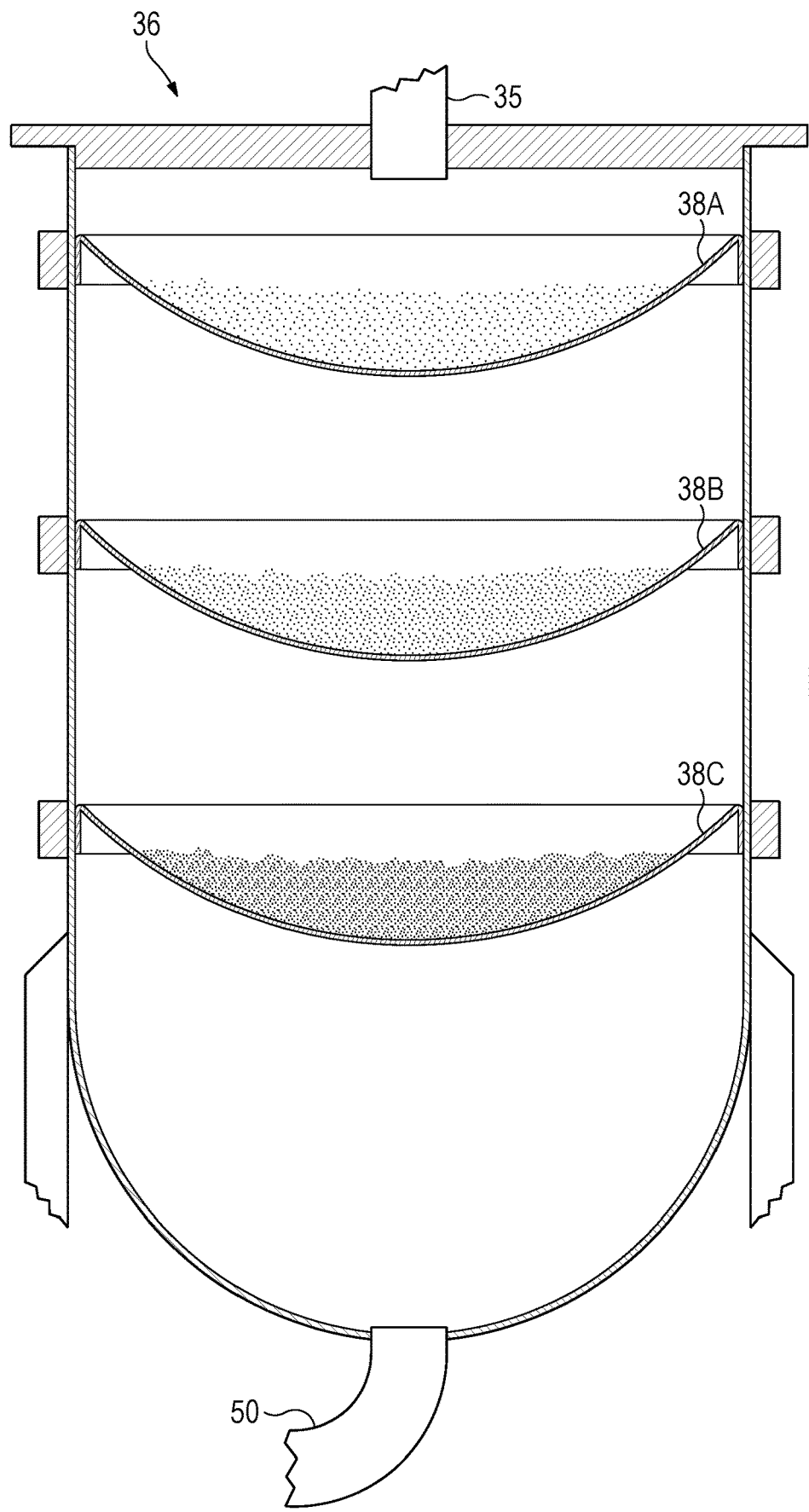
FIG. 3 is a sectional view of a filtering unit, of the assembly of FIG. 1.

The water 26 continually exits through pipe 35 to one out of a plurality of filtering units 36A, 36B and 36C (collectively referenced as "36"), where (referring now to FIG. 3) it is passed through a series of filters 38A, 38B and 38C (collectively referenced as "38") of decreasing mesh (pore) size. Although only 3 filters are shown, for ease of presentation, in preferred embodiments seven filters or more are used. The larger mesh size filters 38A and 38B, which are encountered first, remove the plant material which was able to pass through the perforations of the trommel 20, but are larger than individual trichomes. The trichomes are caught in the smaller mesh size filter(s) 38C, particularly the 120-40-micron filter range. In one embodiment a vibrational unit causes the active filter unit 36 to vibrate, to encourage the flow of water through the filters. In one embodiment, filters 38 are in the form of metal screens, which may be washed and used again. But in another embodiment, they are made of a fibrous material and are disposable.

Once the filters in one filtering unit are saturated, the trichome-containing water is diverted to another filtering unit 36. Saturation may be detected by measuring an increased pressure or decreased flow rate in the fluid passageway leading to the filter unit 36, by a sensor 40 (FIG. 4). An input valve 41 is provided for each filtering unit 36, so that an operator may stop the flow into one unit 36, and open flow to another.

A user input and control unit 60 (FIG. 4) permits a user to either directly control the functioning of system 10, or to set up automatic functioning. The speed of conveyer belts 16 and 44 and trommel 20 are coordinated so that CPF is moved through the system without overloading any portion of the system 10. Unit 60 is designed to facilitate an operator in meeting the Good Manufacturing Practices guidelines published by the US Food and Drug Administration (FDA). In embodiments, set points that an operator can enter for system 10 operation include water temperature, feed rate, trommel speed, and water flow rate. In further embodiments, other set points can be entered. Unit 60 plus sensor 40 and any further sensors is termed a "sensing and control assembly."

In a preferred embodiment, when sensor 40 detects increased pressure or decreased flow, it issues an alert to an operator who turns one valve 41, to stop the flow to one of the units 36 and turns a second valve 41 to begin flow to another unit 36. In an alternate preferred embodiment, valves 41 are automatic and controlled by unit 60, which directly shuts off flow to the active unit 36 and switches flow, in embodiments according to user selection, to another unit 36. This switching may include temporarily shutting off flow through pipe 35. After flow to the saturated filtering unit 36 has been stopped, that filtering unit 36 may be removed to be processed, removing the trichomes so they can be further concentrated into a high-quality product.

In greater detail the water pumped into extraction unit 18 is purified, by a water purifier 42 (FIG. 4) as well as being chilled. Purifier 42 could take the form of a reverse osmosis or distillation unit. The water is recirculated through piping 50, through a further extraction processor 52 (FIG. 4), which in embodiments takes the form of a centrifuge unit, for removing dissolved or suspended substances such as trichomes, not caught in assembly 36, terpenes and pigments. In embodiments, water from processor 52 is recycled, flowing through piping 54 (FIG. 4), into water purifier 42. But because some water is constantly lost with the plant refuse exiting by exit conveyer belt 44, a water input into purifier 42 is also needed. The infeed conveyer 16 is an integrated flighted incline conveyor has an adjustable flight spacing, to help vary the speed with which the chilled CPF is moved into unit 18.

In a preferred embodiment sensor 40 is accompanied by further flow or pressure sensors or both (not shown), located in various locations along the pipes 35, 50 and 54 of the system, with the outputs being fed into unit 60 to monitor operations. Additionally, a set of pumps (not shown) are present at required locations and are controlled by control unit 60, informed by the sensors noted above, to move water through the system 10 in a coordinated manner.

The disclosed embodiments are illustrative, not restrictive. While specific configurations of the plant material processing have been described, it is understood that the present invention can be applied to a wide variety of plant material processing. There are many alternative ways of implementing the invention.

What is claimed is:

1. A method of separating trichomes from cannabis plant flowers (CPF) comprising the steps of:

delivering CPF to a hopper (14);

continuously conveying the delivered CPF from the hopper (14) to an open end of a perforated horizontal drum (20) having internal helical flights (22), with a conveyor (16);

introducing the continuously delivered CPF through the open end of the perforated horizontal drum (20) and into an interior thereof, the perforated horizontal drum (20) being at least partially submerged in a tank (24) partially filled with a chilled water bath at a temperature of less than 36° F., the perforations of the horizontal drum (20) being sized to permit trichomes to pass therethrough;

rotating the perforated horizontal drum (20) to agitate and move the CPF through the perforated drum, causing the trichomes to separate from a residual portion of the CPF by exposing the CPF to the chilled water and agitation;

continuously flowing chilled water into the tank (24) and through the perforated wall of the perforated horizontal drum (20), causing separated trichomes to flow out of the interior through the perforated wall of the perforated horizontal drum (20);

continuously passing chilled water containing separated trichomes that has passed through the perforated wall, through a pipe (35) leading from the chilled water bath, and through a first filter unit (36*a*) including at least three consecutive filters (38*a*, 38*b* & 38*c*) of decreasing pore size, decreasing in the direction of flow and at least one of which is sized to capture the separated trichomes; and continuously passing the residual portion of the CPF through an outlet at an opposing end of the rotating perforated horizontal drum (20) opposite to the open end.

2. The method of separating trichomes from cannabis plant flowers (CPF) of claim 1, further comprising the step of:

vibrating said first filter unit (36*a*).

3. The method of separating trichomes from cannabis plant flowers (CPF) of claim 1, further comprising the step of:

adding ice to the chilled water bath.

4. The method of separating trichomes from cannabis plant flowers (CPF) of claim 1, comprising the step of:

monitoring a flow resistance through the first filter unit (36*a*).

5. The method of separating trichomes from cannabis plant flowers (CPF) of claim 4, wherein said flow resistance is measured by measuring water flow through said pipe (35).

6. The method of separating trichomes from cannabis plant flowers (CPF) of claim 4, wherein said flow resistance is measured by measuring water pressure in said pipe (35) leading from said bath to said first filter unit (36*a*).

7. The method of separating trichomes from cannabis plant flowers (CPF) of claim 1, further comprising the step of:

directing the chilled water containing separated trichomes that has passed through the perforated wall to a second filter unit (36*b*) when the flow resistance of the first filter unit (36*a*) exceeds a predetermined threshold.

8. The method of separating trichomes from cannabis plant flowers (CPF) of claim 7, further comprising the step of:

directing the chilled water containing separated trichomes that has passed through the perforated wall to a third filter unit (36*c*) when the flow resistance through the second filter unit (36*b*) exceeds a predetermined threshold.

9. The method of separating trichomes from cannabis plant flowers (CPF) of claim 8, further comprising the step of:

vibrating said third filter unit (36*c*).

10. The method of separating trichomes from cannabis plant flowers (CPF) of claim 7, further comprising the step of:

vibrating said second filter unit (36*b*).

11. The method of separating trichomes from cannabis plant flowers (CPF) of claim 1, wherein at least one of said filters (38*a*, 38*b* & 38*c*) has a pore size of between 40 and 120 microns.

* * * * *